J. F. O'CONNOR.
SHOCK ABSORBER.
APPLICATION FILED JUNE 6, 1919.
1,378,974. Patented May 24, 1921.
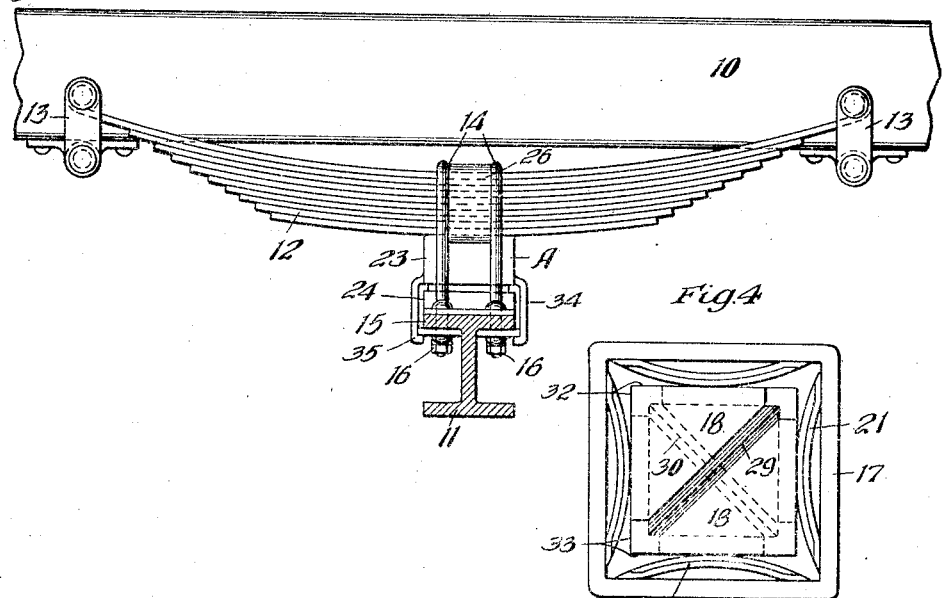
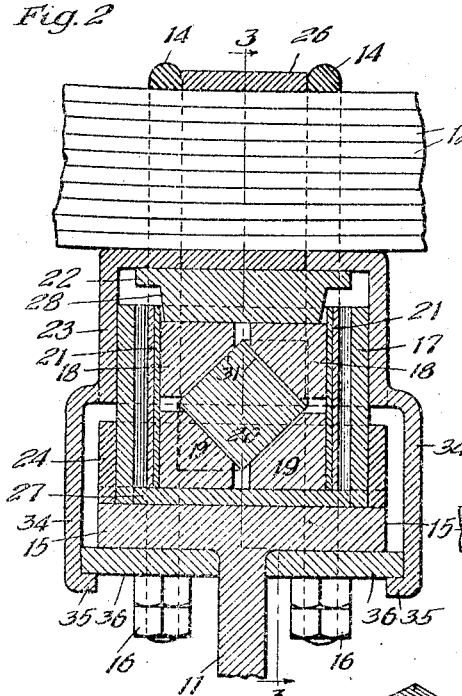
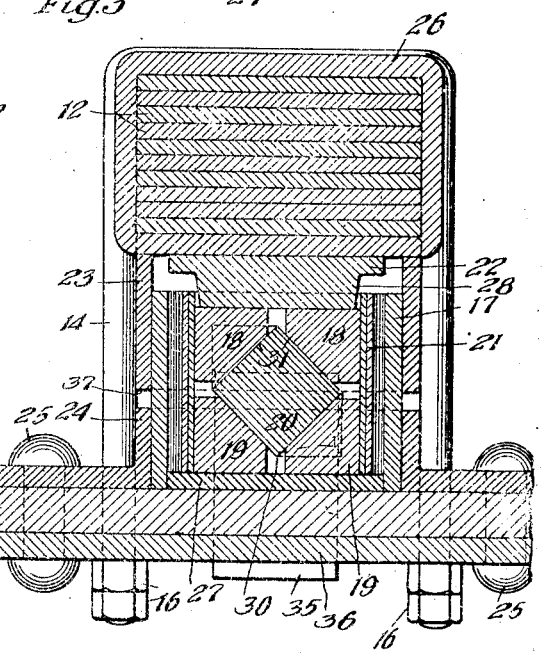
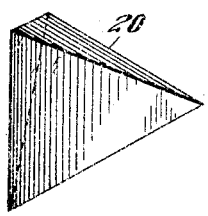
Witnesses
Wm. Geiger
Charles E. Dath
Inventor
John F. O'Connor
By Geo. J. Hought
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

SHOCK-ABSORBER.

1,378,974.

Specification of Letters Patent. Patented May 24, 1921.

Application filed June 6, 1919. Serial No. 302,250.

*To all whom it may concern:*

Be it known that I, JOHN F. O'CONNOR, a citizen of the United States, residing at Chicago, in the county of Cook and State of Illinois, have invented a certain new and useful Improvement in Shock-Absorbers, of which the following is a full, clear, concise, and exact description, reference being had to the accompanying drawings, forming a part of this specification.

This invention relates to improvements in shock absorbers.

One object of the invention is to provide an auxiliary shock absorber for automobiles and other like vehicles for the purpose of absorbing excessive shocks and to relieve the main springs.

Another object of the invention is to provide a shock absorber for automobiles and like vehicles wherein the same is interposed between the main spring and the axle.

In the drawings forming a part of this specification, Figure 1 is a broken elevational view of a portion of an automobile chassis and main spring showing my improvements in connection therewith, the axle being indicated in cross section. Fig. 2 is an enlarged, vertical, sectional view taken parallel to the main spring and illustrating some of the details of the interior construction of the shock absorbing mechanism. Fig. 3 is a vertical, sectional view taken substantially on the line 3—3 of Fig. 2. Fig. 4 is a top plan view of the shock absorbing mechanism proper. And Fig. 5 is a detail perspective of the main wedge employed with my construction.

In said drawing, 10 denotes a portion of an automobile chassis, 11 an axle and 12 a semi-elliptic spring interposed between the chassis and the axle, said spring having the ends thereof attached to the chassis by compensating links 13—13 in a well known manner. Interposed between the spring 12 and the axle 11 is my improved shock absorbing mechanism designated generally by the refernce A. The spring, axle and shock absorber are held against separation by U-shaped bolts 14—14 which pass over the spring and through flanges 15 of the axle, the lower ends of said bolts receiving nuts 16—16.

The shock absorber proper, as shown, preferably comprises a rectangular hollow casing 17, an upper pair of friction wedge blocks 18—18, a lower pair of friction wedge blocks 19—19, a central main wedge 20, four sets of plate springs 21—21 disposed around the inner four sides of the casing 17, and a follower block 22. An outer casing 23 is employed and a lower centering casing 24, the latter being riveted to the axle as indicated by the rivets 25. A band 26 is also preferably extended around the semi-elliptic spring 12 immediately above the shock absorber A.

The shell 17 is positioned within the centering casing 24 as indicated in Figs. 2 and 3 and a wear plate 27 is preferably placed in the bottom of the shell 17. The sets of curved plate springs 21 are arranged as most clearly indicated in Fig. 4, that is, between the various friction wedge blocks 18 and 19 and the side walls of the shell. The follower block 22 has a tapered depending section 28 which is adapted to pass within the sets of springs 21 and engage the tops of the upper friction wedge blocks 18—18.

The central main wedge 20 is a four-faced structure, that is, a triangular pyramid, all four faces of which are similar. It is so arranged between the upper and lower sets of friction wedge blocks 18 and 19 as to present one edge indicated at 29 at the top, said edge extending diagonally of the shell 17. Another edge at the bottom indicated at 30 also extends diagonally of the shell 17 but at right angles to the other diagonal edge 29 as indicated most clearly in Fig. 4. This provides two upper wedging surfaces or faces 31—31 coöperable with the upper wedge blocks 18 having corresponding wedge faces. Said blocks 18 are formed with outer vertical faces 32—32 at right angles to each other adapted to engage two sets of spring plates 21 as shown in Fig. 4. Similarly, the lower friction wedge blocks 19 are formed with wedge faces coöperable with the lower wedge faces of the main wedge 20 and with outer vertical faces 33—33 at right angles to each other arranged to engage two sets of spring plates 21.

The casing 23 has depending fingers 34—34 on opposite sides of the axle, said fingers having inturned flanges 35 adapted to engage under the edges of the plates 36 arranged to be secured to the axle by the bolts 14 which secure the spring and also by the rivets 25. It will be noted that the inner edges of the inturned flanges 35 are spaced apart so that they may slide past the upper flange of the axle and the plates 36 will be inserted after said flanges 35 have been shifted below the flange 15 of the axle. In this way, the casing 23 will hold all parts of the shock absorbing mechanism in assembled relation and prevent any possibility of separation of the parts.

The operation is as follows: The shock absorber being of the frictional type and of relatively high capacity, will not come into action under any ordinary loads imposed upon the spring 12. On the contrary, the spring 12 will absorb all ordinary shocks in the usual manner. However, when an excessive shock occurs, the pressure transmitted through the spring 12 will be imposed on the follower block 22, thus causing the upper friction wedge blocks 18 to be forced downwardly. Downward movement of the wedge blocks 18 will cause the latter to be separated diagonally as they slide over the corresponding faces of the main wedge 20. Friction will thus be generated between the blocks 18 and wedge 20 and the relative movement resisted by the curved plates 21 which will tend to be straightened out against the side walls of the shell 17. As the blocks 18 are forced downwardly and separated, they in turn will force the main wedge 20 downwardly, thus causing the lower friction blocks 19 also to be separated and in turn compressing the spring plates 21. In this manner, high shock absorbing capacity is obtained because of the frictionally engaging surfaces and excessive shocks thereby cushioned.

With the construction shown, it will be observed that I obtain a uniform spreading action on all four sides against the four sets of spring plates 21, each wedge block 18 or 19 moving diagonally and acting against two sets of spring plates 21. When the excessive load is removed, it is evident that the spring plates 21 will tend to return to their original condition, thus forcing the wedge blocks 18 and 19 inwardly and in turn forcing the upper wedge blocks 18 upwardly. In order to prevent over-compression of the spring plates 21, the casing 23 may be limited in its downward movement by engagement with the centering casing 24 as indicated at 37 in Figs. 2 and 3.

Although I have herein shown and described what I now consider the preferred manner of carrying out the invention, the same is merely illustrative and I contemplate all changes and modifications that come within the scope of the claims appended hereto.

I claim:

1. In a shock absorbing mechanism for vehicles having a body element, the combination with an axle, of a semi-elliptic main spring, and an auxiliary friction shock absorbing mechanism interposed between said main spring and the axle at the center of the spring, the spring being directly supported on one part of the mechanism and another part of the mechanism being directly supported on the axle.

2. In a shock absorbing mechanism of the character described, adapted to be interposed between two members of a vehicle or the like to cushion shocks, in combination: a shell, a plurality of friction blocks, springs disposed between said blocks and the walls of the shell, and spreader means frictionally coacting with said blocks and adapted to separate the same to compress said springs upon pressure applied to the blocks, said blocks being bodily movable with respect to the shell and adapted to have pressure applied thereto in lines parallel to said movement.

3. In a shock absorbing mechanism of the character described, the combination with a shell, of a plurality of friction blocks bodily movable with respect to the shell, spreader means frictionally coöperating with said blocks, and plate springs interposed between the blocks and the walls of the shell.

4. In a shock absorbing mechanism, the combination with a shell, of a plurality of friction blocks, a single wedge frictionally coöperable with all of said blocks, and spring means interposed between said blocks and the side walls of the shell, said blocks being bodily movable with respect to the shell and adapted to have pressure applied thereto in lines parallel to said movement.

5. In a shock absorbing mechanism, the combination with a shell, of two sets of bodily movable friction blocks disposed within the shell and longitudinally separated therein, a central block having wedge-acting faces coöperable with all of said friction blocks, and spring means interposed between the friction blocks and the side walls of the shell, said two sets of blocks approaching each other upon actuation of the mechanism.

6. In a shock absorbing mechanism of the character described, the combination with a shell, of two sets of friction blocks disposed within the shell and longitudinally separated therein, there being two friction blocks in each set, a four-faced wedge interposed between the inner and outer sets of friction blocks, one face of said wedge coöperating with each friction block, and spring means interposed between all of said friction blocks and the side walls of the shell, said two sets of blocks approaching each other upon actuation of the mechanism.

7. In a shock absorbing mechanism of the character described, the combination with a shell polygonal in cross section, of sets of laminated springs disposed within said shell, one set for each side of the latter, and a plurality of friction shoes and a spreader disposed between said laminated springs and adapted to flex the latter upon application of pressure to the blocks in a direction lengthwise of the shell.

8. In a shock absorbing mechanism of the character described, the combination with a shell having a plurality of sides, of an upper set of friction blocks, a lower set of friction blocks, a common wedge interposed between said sets of friction blocks and coöperable with all of the latter, and a plurality of sets of laminated springs interposed between the friction blocks and the side walls of the shell, there being one set of laminated springs for each wall of the shell.

9. In a shock absorbing mechanism for vehicles, the combination with a body element of the vehicle, an axle, and a main spring interposed between said element and axle, of an auxiliary shock absorbing mechanism interposed between said spring and the axle, said mechanism comprising a shell, a plurality of friction blocks within the shell, spreading means for said blocks, and spring means interposed between said blocks and the side walls of the shell.

In witness that I claim the foregoing I have hereunto subscribed my name this 16th day of May, 1919.

JOHN F. O'CONNOR.